(12) United States Patent
Tully, Jr. et al.

(10) Patent No.: US 9,567,871 B2
(45) Date of Patent: Feb. 14, 2017

(54) IMPELLER RETENTION APPARATUS

(71) Applicant: Sikorsky Aircraft Corporation, Stratford, CT (US)

(72) Inventors: Thomas L. Tully, Jr., Oxford, CT (US); Daniel Vincent Brown, Hamden, CT (US); Yuriy Gmirya, Woodbridge, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 468 days.

(21) Appl. No.: 14/259,817

(22) Filed: Apr. 23, 2014

(65) Prior Publication Data
US 2015/0308288 A1 Oct. 29, 2015

(51) Int. Cl.
| | | |
|---|---|---|
| *F01D 25/16* | (2006.01) | |
| *B64D 33/08* | (2006.01) | |
| *F04D 17/16* | (2006.01) | |
| *F04D 29/58* | (2006.01) | |
| *F16C 25/08* | (2006.01) | |
| *F16C 19/54* | (2006.01) | |

(52) U.S. Cl.
CPC ............. *F01D 25/164* (2013.01); *B64D 33/08* (2013.01); *F04D 17/16* (2013.01); *F04D 29/582* (2013.01); *F16C 19/54* (2013.01); *F16C 25/08* (2013.01)

(58) Field of Classification Search
CPC ....... B64D 33/08; B64D 33/10; B64D 13/006; B64D 13/06; B64D 13/08; F04D 29/041; F04D 29/042; F04D 29/044; F04D 29/0462; F04D 29/051; F04D 29/052; F04D 29/0563; F04D 17/16; F04D 29/582; F01D 25/16; F01D 25/164; F16C 25/08; F16C 19/54
See application file for complete search history.

(56) References Cited

U.S. PATENT DOCUMENTS

| | | | | |
|---|---|---|---|---|
| 2,474,615 A | * | 6/1949 | Busquet | F01D 25/125 165/170 |
| 3,191,976 A | * | 6/1965 | Arnts | F04D 29/044 403/355 |
| 3,771,927 A | * | 11/1973 | Schiller | F04D 15/0027 415/131 |
| 3,941,506 A | | 3/1976 | Robb et al. | |
| 4,911,610 A | * | 3/1990 | Olschewski | F04D 29/043 384/517 |

(Continued)

*Primary Examiner* — Tien Dinh
*Assistant Examiner* — Alexander V Giczy
(74) *Attorney, Agent, or Firm* — Cantor Colburn LLP

(57) ABSTRACT

An impeller retention apparatus is provided. The impeller retention apparatus includes a bearing element, a rotatable gear shaft rotatably supported within an outer body by the bearing element, an impeller disposed about and coupled to the rotatable gear shaft to rotate with the rotatable gear shaft, a preload spacer and a flexible coupling. The preload spacer is disposed along the rotatable gear shaft between the impeller and the bearing element and includes a forward preload spacer end abutting an aft end of the bearing element, an aft preload spacer end abutting a forward face of the impeller and an elastic element that biases the impeller away from the bearing element in an axial direction along the rotatable gear shaft. The flexible coupling is coupled to the rotatable gear shaft such that the outer body and the flexible coupling cooperatively define an annulus from which the impeller receives an airflow.

14 Claims, 3 Drawing Sheets

(56) References Cited

U.S. PATENT DOCUMENTS

| | | | |
|---|---|---|---|
| 5,624,245 A * | 4/1997 | DeClerck | F04D 29/5893 |
| | | | 415/111 |
| 5,921,683 A | 7/1999 | Merritt et al. | |
| 5,943,776 A | 8/1999 | Wolfe, Jr. et al. | |
| 7,128,061 B2 | 10/2006 | Middlebrook et al. | |
| 7,168,915 B2 | 1/2007 | Doering et al. | |
| 7,182,579 B2 | 2/2007 | Roso et al. | |
| 7,510,372 B2 | 3/2009 | Bogue et al. | |
| 7,603,915 B2 | 10/2009 | Spivak et al. | |
| 7,665,963 B2 | 2/2010 | Bogue et al. | |
| 7,757,675 B2 | 7/2010 | Middlebrook et al. | |
| 8,192,180 B2 | 6/2012 | Horng et al. | |
| 8,215,919 B2 | 7/2012 | Jewess et al. | |
| 8,245,700 B2 | 8/2012 | Middlebrook et al. | |
| 8,414,274 B2 | 4/2013 | Horng et al. | |
| 2004/0006994 A1 * | 1/2004 | Walsh | F01D 17/162 |
| | | | 60/792 |
| 2008/0031736 A1 * | 2/2008 | Liao | F04D 25/0613 |
| | | | 416/133 |
| 2009/0214331 A1 | 8/2009 | Jewess et al. | |
| 2012/0006043 A1 | 1/2012 | Ku | |
| 2012/0020797 A1 | 1/2012 | Yilmaz | |
| 2012/0114504 A1 | 5/2012 | Telakowski et al. | |
| 2012/0328417 A1 | 12/2012 | Blewett et al. | |
| 2013/0223997 A1 * | 8/2013 | Childe | F16C 27/066 |
| | | | 415/170.1 |
| 2013/0259639 A1 * | 10/2013 | Suciu | F02C 7/047 |
| | | | 415/1 |
| 2014/0017060 A1 | 1/2014 | Duong et al. | |

* cited by examiner

IMPELLER RETENTION APPARATUS

FEDERAL RESEARCH STATEMENT

This invention was made with government support under Contract No. N00019-06-C-0081 awarded by the Navy. The government has certain rights in the invention.

BACKGROUND OF THE INVENTION

The subject matter disclosed herein relates to an impeller retention apparatus of an aircraft and, more particularly, to an impeller retention apparatus of an aircraft that includes a preload spacer.

An aircraft, such as a helicopter, includes an airframe formed to define a cabin, a main rotor and a tail rotor, which are supportively disposed at upper and tail portions of the airframe, respectively. An engine drives rotation of the main and tail rotors via a transmission system including a shaft that extends through the tail portion. In such aircraft, retention of a shaft driven impeller that is typically utilized to move air through a heat exchanger has traditionally been achieved with a threaded locknut. In many cases, the impeller would either use internal splines or a keyway as an interface with the driving shaft and be held in place with the threaded locknut.

These types of retention schemes for the impeller can give rise to a sharp corner or thread radii on the outer diameter of the shaft. These sharp corners or thread radii produce stress concentrations which ultimately can be an origin for a shaft fracture. In addition, locknuts can loosen and result in loss of preloading.

BRIEF DESCRIPTION OF THE INVENTION

According to one aspect of the invention, an impeller retention apparatus is provided and includes a bearing element, a rotatable shaft, which is rotatably supported within an outer body by the bearing element, an impeller disposed about and coupled to the shaft to rotate with the shaft and a preload spacer disposed along the shaft between the impeller and the bearing element, the preload spacer comprising an elastic element which biases the impeller away from the bearing element in an axial direction along the shaft.

In accordance with additional or alternative embodiments, the impeller retention apparatus further includes a flexible coupling coupled to the gear shaft such that the outer body and the flexible coupling cooperatively define an annulus, wherein the impeller receives the airflow from the annulus.

In accordance with additional or alternative embodiments, the gear shaft is rotationally fixed relative to the flexible coupling.

In accordance with additional or alternative embodiments, the flexible coupling includes diaphragms and the impeller is disposed about and coupled to the flexible coupling and is movable in the axial direction from a position at which the impeller is adjacent to a forward-most one of the diaphragms.

In accordance with additional or alternative embodiments, the flexible coupling includes titanium.

In accordance with additional or alternative embodiments, the flexible coupling and the impeller are coefficient of thermal expansion (CTE) mismatched.

In accordance with additional or alternative embodiments, the preload spacer includes a helical compression spring.

In accordance with additional or alternative embodiments, the preload spacer includes a forward end to abut an aft end of the bearing elements, an aft end to abut a forward face of the impeller and a spring coupled at opposite ends thereof to the forward and aft ends, respectively.

According to another aspect of the invention, an aircraft is provided and includes an engine, a transmission and an impeller retention apparatus. The impeller retention apparatus includes an outer body, a gear shaft rotatably drivable by the engine via the transmission and disposed to extend through the outer body, the gear shaft including a first axial portion and a second axial portion aft of the first axial portion, bearing elements disposed on the first axial portion of the gear shaft, a flexible coupling including a first axial portion coupled to the second axial portion of the gear shaft and a second axial portion aft of the first axial portion, the outer body and an exterior surface of the first axial portion of the flexible coupling cooperatively defining an annulus, an impeller configured to receive airflow from the annulus, the impeller being disposed on and movable in an axial direction relative to the second axial portion of the flexible coupling and a preload spacer disposed between the impeller and the bearing elements to bias the impeller toward aft axial movement.

In accordance with additional or alternative embodiments, the gear shaft is rotationally fixed relative to the flexible coupling.

In accordance with additional or alternative embodiments, the flexible coupling includes diaphragms and the impeller is movable in the axial direction from a position at which the impeller is adjacent to a forward-most one of the diaphragms.

In accordance with additional or alternative embodiments, the flexible coupling includes titanium.

In accordance with additional or alternative embodiments, the flexible coupling and the impeller are coefficient of thermal expansion (CTE) mismatched.

In accordance with additional or alternative embodiments, the preload spacer includes an elastic element.

In accordance with additional or alternative embodiments, the preload spacer includes a forward end to abut an aft end of the bearing elements, an aft end to abut a forward face of the impeller and a spring coupled at opposite ends thereof to the forward and aft ends, respectively.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

As will be described below, a shaft driven impeller is mounted concentrically to a driving shaft (in this case, the shaft portion of a flexible coupling) in an aircraft transmission and is driven by the driving shaft. A preload spacer sits adjacent to the impeller on the outer diameter of the shaft and is compressed to generate an axial force that retains the impeller on the driving shaft.

Figure 1:
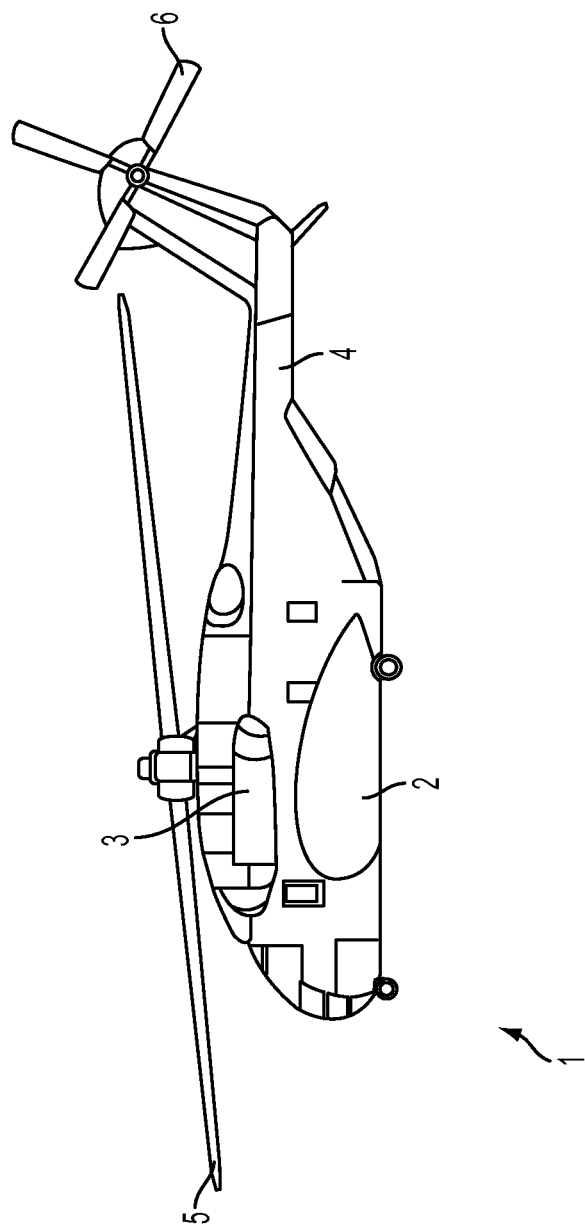
FIG. 1 is a schematic side view of an aircraft in accordance with embodiments.

With reference to FIG. 1, an aircraft 1 is provided and may be configured as a helicopter. The aircraft 1 includes an airframe 2 that has an upper portion 3 and a tail portion 4 and which is formed to define a cabin and to enclose an engine and a transmission system. The aircraft 1 further includes a main rotor 5 and a tail rotor 6, which are supportively disposed at the upper portion 3 and the tail portion 4, respectively. The engine drives rotation of the main rotor 5 and the tail rotor 6 via the transmission system with the rotation of the main rotor 5 providing thrust for the aircraft 1 and the rotation of the tail rotor 6 resisting the torque generated by the main rotor 5. As shown in FIG. 1, the tail portion 4 extends away from the cabin in the aft direction and a drive/gear shaft of the transmission extends through the tail portion 3 to connect with the tail rotor 6.

Figure 2:
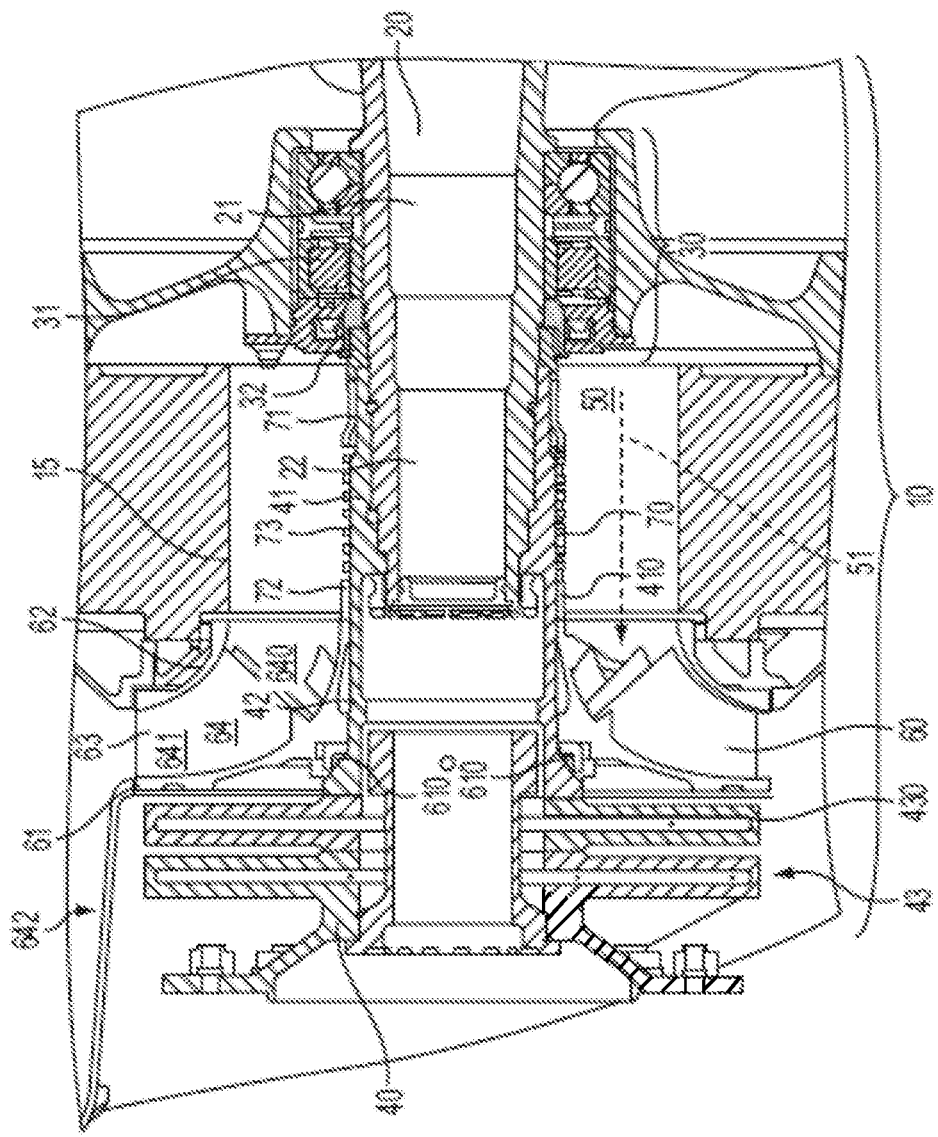
FIG. 2 is a side view of an impeller retention apparatus in accordance with embodiments.
Figure 3:
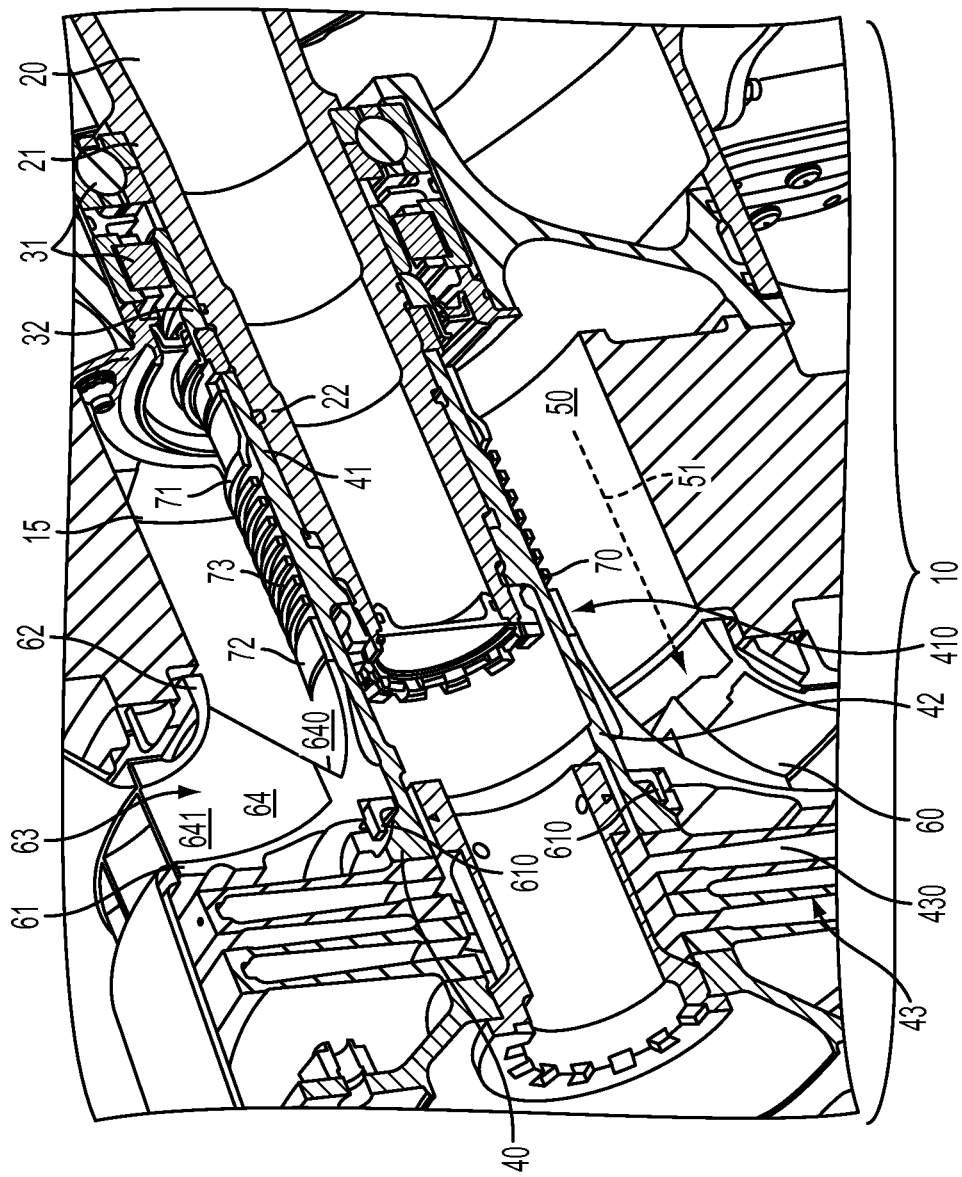
FIG. 3 is a perspective view of the impeller retention apparatus of FIG. 2.

With reference to FIGS. 2 and 3, an impeller retention apparatus 10 of an aircraft is provided and may be disposed for example within the aircraft 1 of FIG. 1. The impeller retention apparatus 10 includes an outer body 15 (e.g., a heat exchanger), a gear shaft 20 and bearing elements 30. The gear shaft 20 is disposed to extend through the outer body 15 and may be driven by the engine/transmission to be rotatable about a central longitudinal axis. The gear shaft 20 includes a first axial portion 21 and a second axial portion 22. The second axial portion 22 is defined aft of the first axial portion 21 (i.e., the first axial portion 21 is disposed between the second axial portion 22 and the engine (not shown)). The bearing elements 30 include roller bearing elements 31 and a nut bearing element 32 and are disposed on the first axial portion 21 to support and to permit the rotation of the gear shaft 20.

The impeller retention apparatus 10 further includes a flexible coupling 40. The flexible coupling 40 includes a first axial portion 41 and a second axial portion 42. The first axial portion 41 is coupled to the second axial portion 22 of the gear shaft 20 such that the gear shaft 20 is rotationally fixed relative to the flexible coupling 40. A forward end of the first axial portion 41 abuts the nut bearing element 32. A nut may be provided as part of or with the nut bearing element 32 to secure the position of the first axial portion 41. The second axial portion 42 is defined aft of the first axial portion 41 (i.e., the first axial portion 41 is between the second axial portion 42 and the nut bearing element 32).

The flexible coupling 40 serves to structurally support the second axial portion 22 at the aft end of the gear shaft 20. The impeller 60 provides heat removal from the transmission heat exchanger to an exterior area (i.e., outside of the aircraft, and/or to an interior area or ductwork suitable to receive waste heat). To this end, the flexible coupling 40 may include one or more diaphragms 43 that extend radially outwardly from an external surface of the flexible coupling 40. Each of these diaphragms 43 have substantial surface areas that provide for corresponding levels of heat transfer capability. In accordance with embodiments, the diaphragms 43 may be arranged along a longitudinal axis of the second axial portion 42 such that one is a forward-most one 430 of the diaphragms 43.

The first axial portion 41 of the flexible coupling 40 includes an exterior surface 410. The outer body 15 and the exterior surface 410 cooperatively defining an annulus 50. This annulus 50 extends axially along a longitudinal portion of the gear shaft 20 and provides for airflow 51. An impeller 60 is configured to receive this airflow 51 from the annulus 50 and is disposed on and is configured to be movable in an axial direction relative to the second axial portion 42 of the flexible coupling 40.

The impeller 60 includes a first body 61, a second body 62 and a plurality of vanes 63. The first body 61 is annular and has a curvilinear cross section such that a forward portion of the first body 61 runs along the flexible coupling 40 in an axial direction and an aft portion of the first body 61 curves away from the flexible coupling 40 in a radial direction. The second body 62 is similarly annular and has a curvilinear cross section that is displaced from but otherwise similarly shaped with respect to the first body 61 such that the first and second bodies 61 and 62 form a curved pathway 64 for the airflow 51 with an input opening 640 and an output opening 641. The output opening 641 is fluidly coupled to a plenum 642 that may be associated with a heat outlet. Each of the plurality of vanes 63 is supported on the first and second bodies 61 and 62 and curved in the radial direction from the input opening 640 to the output opening 641.

An interior surface of the first body 61 contacts with the second axial portion 42 of the flexible coupling 40 or may include tabs 610 that engage with corresponding portions of the second axial portion 42 of the flexible coupling 40. In either case, a rotation of the gear shaft 20 is transmitted to the first axial portion 41 of the flexible coupling 40 and then to the second axial portion 42 of the flexible coupling 40, and is further at least partially transmitted to the impeller 60. With the impeller 60 thus driven to rotate, the plurality of vanes 63 encourages the airflow 51 to flow through the curved pathway 64 and into the plenum 642 to thereby increase a cooling effect of the heat exchanger.

In accordance with embodiments, the flexible coupling 40 may include titanium or other similar materials while the impeller 60 is generally formed of different materials. Thus, the flexible coupling 40 has a first coefficient of thermal expansion (CTE) and the impeller 60 has a second CTE, which is mismatched from the first CTE. The mismatched CTEs of the flexible coupling 40 and the impeller 60 as well as flight conditions and the rotation of the impeller 60 tend to result in the impeller 60 being urged to move forwardly in the axial direction along the shaft 20 towards the bearing 30 and away from a position at which the impeller 60 is adjacent to the forward-most one 430 of the diaphragms 43.

In order to prevent the forward movement of the impeller 60 in the axial direction, the impeller retention apparatus 10 further includes a preload spacer 70. The preload spacer 70 is disposed between the impeller 60 and the bearing elements 30 and configured to bias the impeller 60 against the forward movement of the impeller 60 in the axial direction and toward aft directed axial movement. This bias maintains the position of the impeller 60 substantially adjacent to the forward-most one 430 of the diaphragms 43.

In accordance with embodiments, the preload spacer 70 may include a forward end 71, an aft end 72 and an elastic element 73. The forward end 71 is disposed to abut an aft end of the bearing elements 30 or, more particularly, to abut an aft end of the nut bearing element 32 which overhangs the forward end of the first axial portion 41 abutting the nut bearing element 32. The forward end 71 may be tapered to account for changes in the outer diameter of the first axial portion 41 of the flexible coupling 40. The aft end 72 is disposed to abut a forward face of the first body 61 of the impeller 60. The elastic element 73 is shown as a helical compression spring or another similar feature, and is coupled at opposite ends thereof to the forward and aft ends 71 and 72, respectively. However, it is understood that other elements could be used to bias the ends 71 and 72, including non-helical springs, elastic materials, and the like.

The preload spacer 70 is configured to tightly fit around the exterior surface 410 of the first axial portion 41 of the flexible coupling 40 and is preloaded in compression between the aft end of the nut bearing element 32 and the forward face of the first body 61 of the impeller 60 when the impeller 60 is fully coupled to the gear shaft 20. This preloading in compression provides the bias applied by the preload spacer 70 that maintains the position of the impeller 60 substantially adjacent to the forward-most diaphragm 430 of the diaphragms 43.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. By way of example, while shown in the context of a conventional helicopter, it is understood that other aspects could be implemented in other types of vehicles, such as coaxial helicopters, fixed wing aircraft, etc. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An impeller retention apparatus, comprising:
a bearing element;
a rotatable gear shaft, which is rotatably supported within an outer body by the bearing element;
an impeller disposed about and coupled to the rotatable gear shaft to rotate with the rotatable gear shaft;
a preload spacer disposed along the rotatable gear shaft between the impeller and the bearing element, the preload spacer comprising a forward preload spacer end to abut an aft end of the bearing element, an aft preload spacer end to abut a forward face of the impeller and an elastic element which biases the impeller away from the bearing element in an axial direction along the rotatable gear shaft; and
a flexible coupling coupled to the rotatable gear shaft such that the outer body and the flexible coupling cooperatively define an annulus from which the impeller receives an airflow.

2. The impeller retention apparatus according to claim 1, wherein the flexible coupling is rotationally fixed relative to the rotatable gear shaft.

3. The impeller retention apparatus according to claim 1, wherein:
the flexible coupling further comprises diaphragms,
the impeller is disposed about and coupled to the flexible coupling, and
the impeller is movable in the axial direction from a position at which the impeller is adjacent to a forward-most one of the diaphragms.

4. The impeller retention apparatus according to claim 1, wherein the flexible coupling comprises titanium.

5. The impeller retention apparatus according to claim 1, wherein the flexible coupling and the impeller are coefficient of thermal expansion (CTE) mismatched.

6. The impeller retention apparatus according to claim 1, wherein the preload spacer comprises a helical compression spring.

7. The impeller retention apparatus according to claim 1, wherein the preload spacer comprises a spring coupled at its opposite ends thereof to the forward and aft preload spacer ends.

8. An aircraft, comprising:
an engine;
a transmission; and
an impeller retention apparatus comprising:
an outer body;
a rotatable gear shaft rotatably drivable by the engine via the transmission and disposed to extend through the outer body, the rotatable gear shaft including a first axial portion and a second axial portion which is disposed aft of the first axial portion;
bearing elements disposed on the first axial portion of the rotatable gear shaft;
a flexible coupling including a first flexible coupling axial portion, which is coupled to the second axial portion of the gear shaft, and a second flexible coupling axial portion, which is disposed aft of the first flexible coupling axial portion,
the outer body and an exterior surface of the first flexible coupling axial portion cooperatively defining an annulus;
an impeller configured to receive airflow from the annulus, the impeller being disposed on the second flexible coupling axial portion and movable in an axial direction relative to the second flexible coupling axial portion; and
a preload spacer disposed between the impeller and the bearing elements to bias the impeller toward aft axial movement.

9. The aircraft according to claim 8, wherein the flexible coupling is rotationally fixed relative to the rotatable gear shaft.

10. The aircraft according to claim 8, wherein:
the flexible coupling further comprises diaphragms, and
the impeller is movable in the axial direction from a position at which the impeller is adjacent to a forward-most one of the diaphragms.

11. The aircraft according to claim 8, wherein the flexible coupling comprises titanium.

12. The aircraft according to claim 8, wherein the flexible coupling and the impeller are coefficient of thermal expansion (CTE) mismatched.

13. The aircraft according to claim 8, wherein the preload spacer comprises an elastic element.

14. The aircraft according to claim 8, wherein the preload spacer comprises:
a forward preload spacer end to abut an aft end of the bearing elements;
an aft preload spacer end to abut a forward face of the impeller; and
a spring coupled at its opposite ends to the forward and aft preload spacer ends.

* * * * *